(12) United States Patent
Willcox et al.

(10) Patent No.: US 10,060,813 B2
(45) Date of Patent: Aug. 28, 2018

(54) HIGH OVER-PRESSURE CAPABLE SILICON DIE PRESSURE SENSOR

(71) Applicant: Rosemount Inc., Shakopee, MN (US)

(72) Inventors: Charles R. Willcox, Chanhassen, MN (US); Nicholas E. Meyer, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 134 days.

(21) Appl. No.: 15/277,161

(22) Filed: Sep. 27, 2016

(65) Prior Publication Data

US 2017/0089787 A1    Mar. 30, 2017

Related U.S. Application Data

(63) Continuation-in-part of application No. 14/868,901, filed on Sep. 29, 2015, now Pat. No. 9,719,872.

(51) Int. Cl.
G01L 9/12 (2006.01)
G01L 9/00 (2006.01)
G01L 19/06 (2006.01)

(52) U.S. Cl.
CPC ........ G01L 9/0047 (2013.01); G01L 19/0618 (2013.01)

(58) Field of Classification Search
None
See application file for complete search history.

(56) References Cited

U.S. PATENT DOCUMENTS

| | | |
|---|---|---|
| 4,163,964 A | 8/1979 | De Filippis |
| 4,364,276 A | 12/1982 | Shimazoe et al. |
| 4,535,851 A | 8/1985 | Kirkpatrick |
| 4,703,664 A | 11/1987 | Kirkpatrick |
| 4,782,319 A | 11/1988 | Dell' Acqua |
| 5,058,435 A | 10/1991 | Terry |
| 5,062,302 A | 11/1991 | Petersen |
| 5,184,515 A | 2/1993 | Terry |
| 5,333,504 A | 8/1994 | Lutz et al. |

(Continued)

FOREIGN PATENT DOCUMENTS

| | | |
|---|---|---|
| DE | 3703697 A1 | 8/1987 |
| DE | 69321717 T2 | 5/1999 |

(Continued)

OTHER PUBLICATIONS

Notification of Transmittal of the International Search Report and the Written Opinion of the International Searching Authority from PCT/US2017/023309, dated Jun. 21, 2017.

(Continued)

Primary Examiner — Andre Allen
(74) Attorney, Agent, or Firm — Westman, Champlin & Koehler, P.A.

(57) ABSTRACT

A sensor includes a diaphragm having a bonding portion and a main boss separated from the bonding portion by at least one channel, the main boss having a first side face, a second side face and a chamfered corner face connecting the first side face to the second side face. A base of the sensor has a first contact area aligned with the main boss and separated from the main boss, wherein the bonding portion of the diaphragm is bonded to the base. At least one sensing element senses movement of the diaphragm.

21 Claims, 11 Drawing Sheets

(56) References Cited

U.S. PATENT DOCUMENTS

| | | |
|---|---|---|
| 5,585,311 A | 12/1996 | Ko |
| 6,647,794 B1 | 11/2003 | Nelson et al. |
| 6,883,380 B2 | 4/2005 | Romo |
| 7,240,558 B2 | 7/2007 | Ernsberger et al. |
| 8,276,458 B2 | 10/2012 | Hedtke |
| 9,403,677 B2 | 8/2016 | Doelle |
| 2002/0017143 A1 | 2/2002 | Burczyk |
| 2003/0074973 A1 | 4/2003 | Kurtz et al. |
| 2003/0107096 A1 | 6/2003 | Kurtz et al. |
| 2006/0086188 A1 | 4/2006 | Avramescu |
| 2008/0160659 A1* | 7/2008 | Craddock ............... B81B 3/007 438/53 |
| 2013/0118265 A1 | 5/2013 | Besling et al. |
| 2015/0166327 A1 | 6/2015 | Doelle |
| 2015/0192487 A1 | 7/2015 | Belov et al. |
| 2016/0146687 A1 | 5/2016 | Longu |
| 2018/0087988 A1* | 3/2018 | Romo ................... G01L 9/0054 |

FOREIGN PATENT DOCUMENTS

| | | |
|---|---|---|
| DE | 10 2009 031 705 | 1/2011 |
| DE | 102010040373 A1 | 3/2012 |
| EP | 2 891 871 | 7/2015 |
| FR | 3007134 A1 | 12/2014 |

OTHER PUBLICATIONS

Notification of Transmittal of the International Search Report and the Written Opinion of the International Searching Authority from PCT/US2016/053890, dated Jun. 1, 2017.

International Search Report and Written Opinion of International Application No. PCT/US2016/049187, dated Dec. 13, 2016, 13 pages.

Communication from European Patent Application No. 16763147.2, dated May 11, 2018.

* cited by examiner

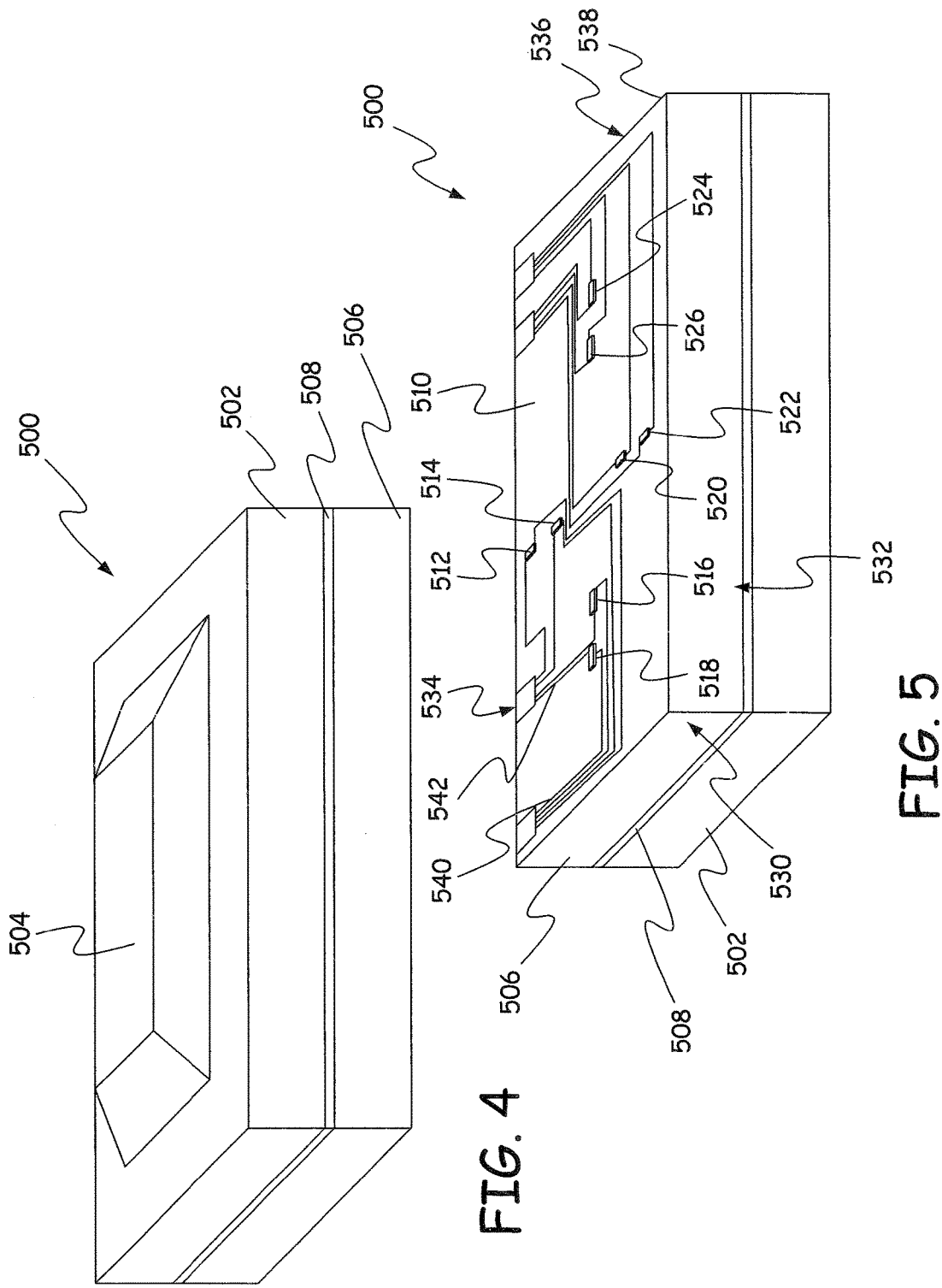

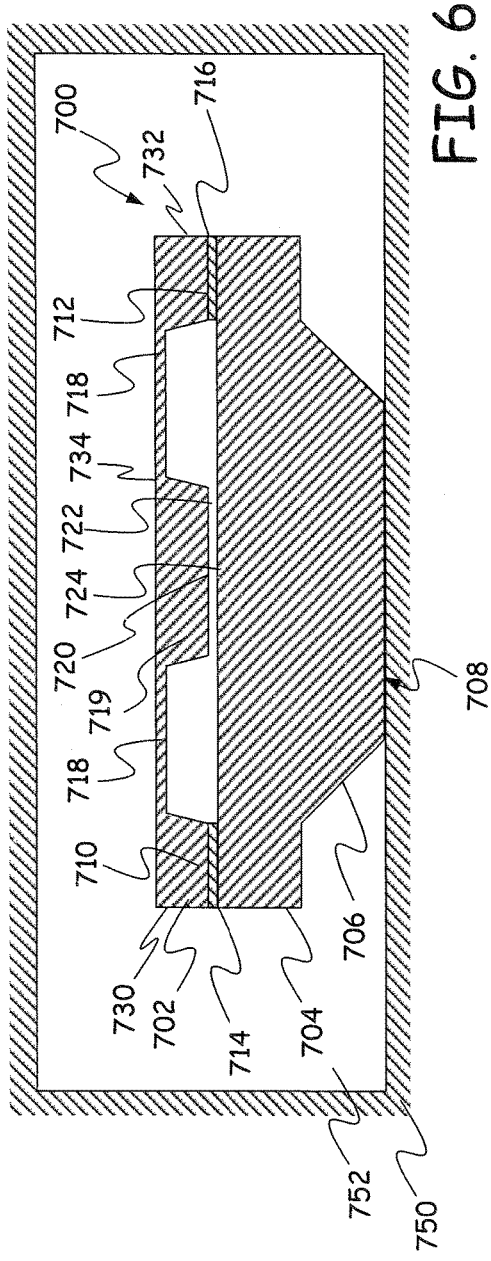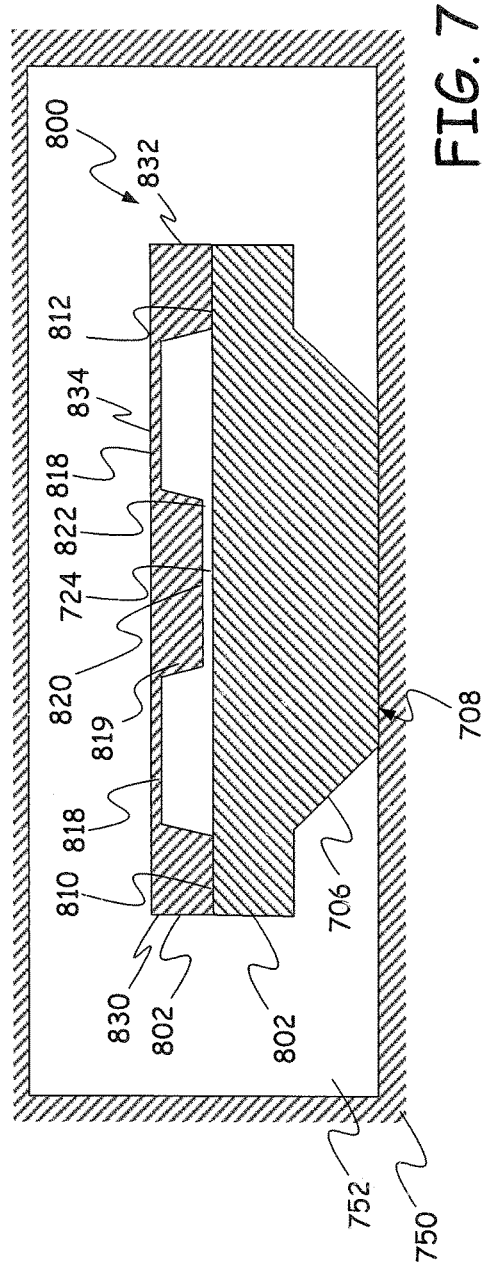

HIGH OVER-PRESSURE CAPABLE SILICON DIE PRESSURE SENSOR

CROSS-REFERENCE TO RELATED APPLICATION

The present application is a Continuation-in-Part of and claims priority of U.S. patent application Ser. No. 14/868,901, filed Sep. 29, 2015, the content of which is hereby incorporated by reference in its entirety.

FIELD

The present disclosure relates to pressure sensors. In particular, the present disclosure relates to pressure sensors with over-pressure protection.

BACKGROUND

In many pressure sensors, a flexible diaphragm moves relative to a base in response to pressure applied to the top of the diaphragm Diaphragms that provide repeatable monotonic movement in response to applied pressures are preferred. As a result, crystalline diaphragms, such as those made from crystalline silicon have been widely adopted since they provide monotonic movement in response to applied pressures and are generally free of hysteretic effects. Unfortunately, sensors with such crystalline structures have limited over-pressure capability and excessive pressure on the sensor diaphragm can cause large tensile stresses that exceed the crystalline structure's maximum fracture strength. Failures in such sensors tend to be catastrophic often resulting in an entirely shattered structure.

SUMMARY

A sensor includes a diaphragm having a bonding portion and a main boss separated from the bonding portion by at least one channel, the main boss having a first side face, a second side face and a chamfered corner face connecting the first side face to the second side face. A base of the sensor has a first contact area aligned with the main boss and separated from the main boss, wherein the bonding portion of the diaphragm is bonded to the base. At least one sensing element senses movement of the diaphragm.

In a further embodiment, a pressure sensor includes a base, a diaphragm positioned over the base and having at least one boss with a chamfered corner, and a sensing element positioned to sense changes in the diaphragm.

In a still further embodiment, a pressure sensor includes a base and a diaphragm comprising a main boss with two edges and a corner between the two edges and a pyramid boss positioned proximate the corner of the main boss and having a base with an edge that is oblique to both of the two edges of the main boss. A sensing element senses movement of the diaphragm.

BRIEF DESCRIPTION OF THE DRAWINGS

FIG. 4 provides a bottom perspective view of a pressure sensor of one embodiment.

FIG. 5 provides a top perspective view of the pressure sensor of FIG. 4.

FIG. 6 provides a sectional view of a pressure sensor of one embodiment.

FIG. 7 provides a sectional view of a pressure sensor of a second embodiment.

DETAILED DESCRIPTION OF ILLUSTRATIVE EMBODIMENTS

The various embodiments provide pressure sensors with crystalline diaphragms, where the pressure sensors include over-pressure bosses and use hydrostatic loading on the sides of the diaphragm and the top of the diaphragm to limit tensile stresses on the diaphragm.

Figure 1:
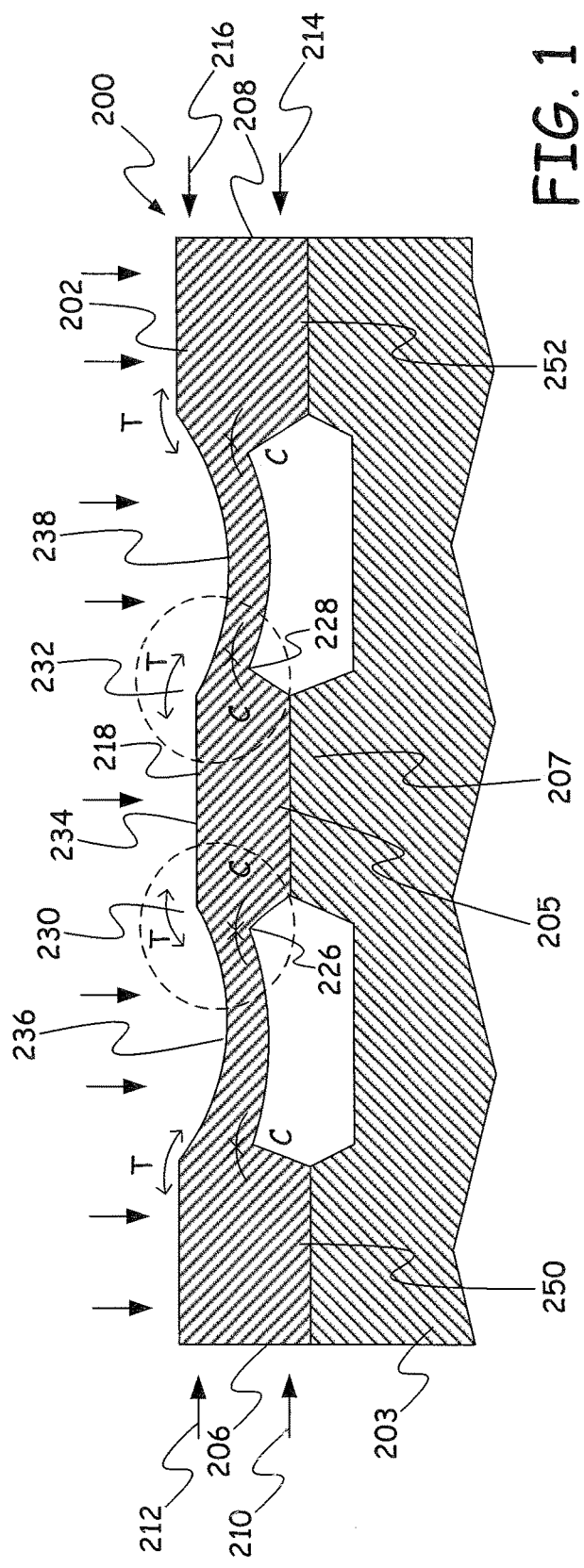
FIG. 1 provides a sectional view of one embodiment of a pressure sensor under high enough pressure such that the diaphragm is contacting a portion of the base and showing tensile and compression stresses.

In accordance with the various embodiments, a pressure sensor 200 of FIG. 1 is provided that includes a diaphragm 202 that is mounted to a base 203 at bonding portions, such as bonding portions 250 and 252 of diaphragm 202. High-pressure contact portions on diaphragm 202 and/or a base 203, such as bosses 205 and 207, interact with each other to inhibit movement of a portion of diaphragm 202 when a hydrostatic pressure load above a threshold is applied to the external top surface 218 and external side surfaces, such as sides 206 and 208, of diaphragm 202. The lateral hydrostatic load applied to sides 206 and 208 is shown by arrows 210, 212, 214 and 216. The contact between diaphragm 202 and base 203 at bosses 205 and 207 together with the lateral hydrostatic load on the sides of diaphragm 202 combine to reduce the tensile stresses applied to the diaphragm 202 such that the maximum principle stress applied to the diaphragm actually decreases as the applied pressure on top surface 218 and sides 206 and 208 increases. This can be seen in the graphs of FIG. 2, which shows applied pressure along horizontal axis 300 and maximum principle stress along vertical axis 302.

Figure 2:
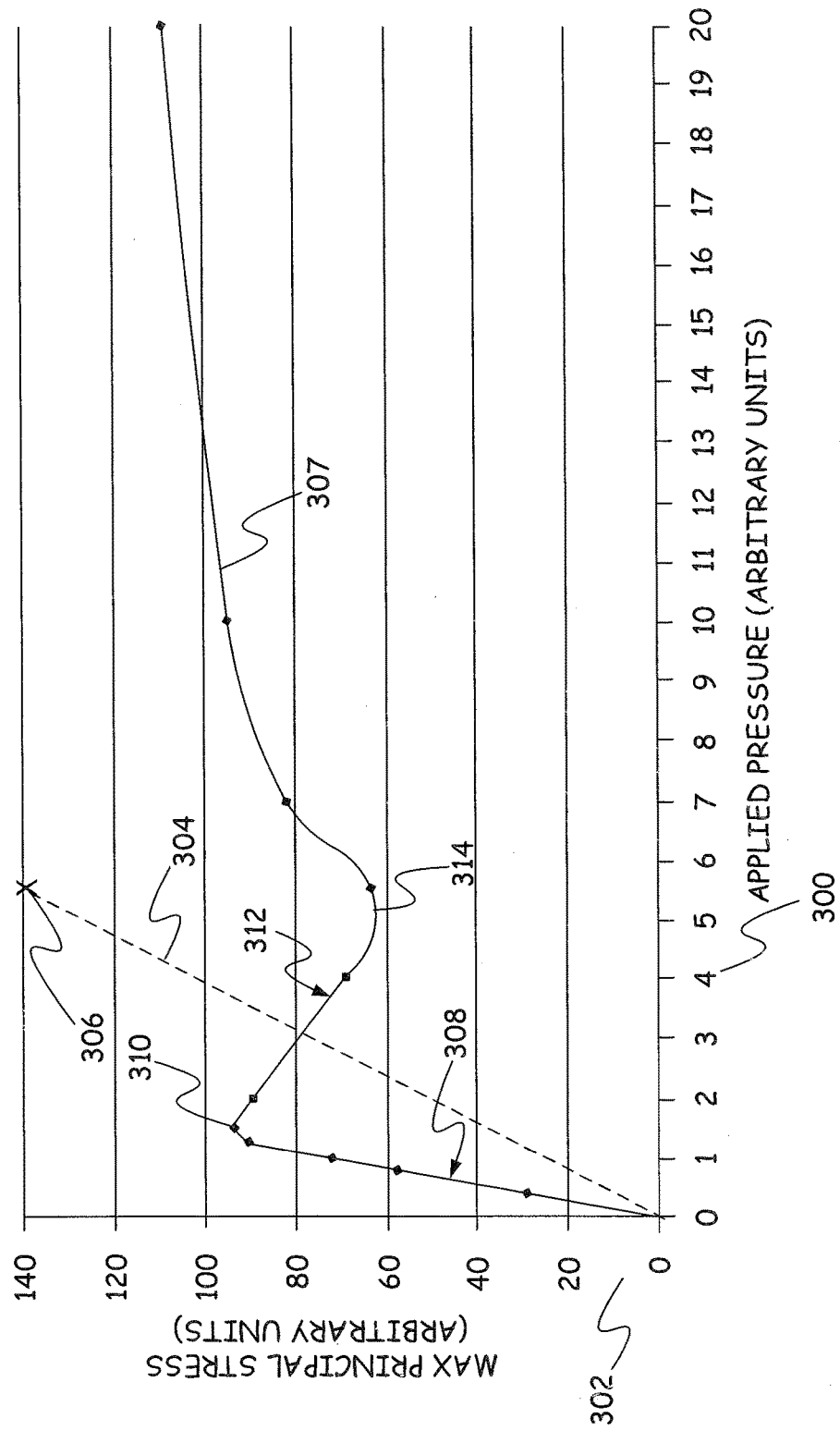
FIG. 2 provides example graphs of maximum principle stress as a function of applied pressures.

Graph 304 of FIG. 2 indicates that the maximum principle stress for the diaphragm of a prior art pressure sensor. In graph 304, indicated by a dashed line, the maximum principle stress increases linearly with the applied pressure until a point 306 is reached at which point the stress exceeds the fracture stress for the diaphragm and the diaphragm fractures. Graph 307 of FIG. 2 shows an example of how the maximum principle stress changes with applied pressure for diaphragm sensors of the present embodiments. In FIG. 2, the maximum principle stress increases linearly with applied pressure along portion 308. This occurs when diaphragm 202 flexes without the boss(es) making contact. At point 310, one or more of the bosses make contact. After the boss(es) make contact, the maximum principle stress decreases with applied pressure along portion 312 before beginning to increase again at point 314.

In the embodiment shown in FIG. 2, the change in the maximum principle stress due to the applied pressure before the boss(es) make contact along portion 308 of graph 307 is greater than the change in maximum principle stress for the prior art diaphragm, shown in graph 304. After point 314 in graph 307, the rate of change in the principle stress due to applied pressure is considerably lower than when the boss(es) was not in contact. Note that the maximum principle stresses are not locations where sensing elements, such as resistive strain gages, would be placed since resistive strain gages should be placed in locations that have monotonic changes between the stress and the applied pressure. However, the maximum principle stress indicates the stress at a likely failure point in the diaphragm since the diaphragm is likely to fail at the location that has the highest tensile stress.

In addition to reducing the maximum principle stress, the contact between the bosses and the lateral hydrostatic load convert tensile stresses found in prior art diaphragms into compression stresses at locations 226 and 228 of FIG. 1. Thus, internal portions 226 and 228 of diaphragm 202 that are next to contact portion 205 of diaphragm 202 are under a compression stress after contact portion 205 contacts contact portion 207 of base 203. Conversely, external locations 230 and 232 of diaphragm 202 that are next to an external portion 234 that is above contact portion 205 are under tensile stress. Areas of the diaphragm that are not above a high-pressure contact portion or a bonding area of the diaphragm, such as areas 236 and 238 act as secondary deflectable regions that continue to deflect after the high-pressure contact portions of the diaphragm contact the base.

Crystalline diaphragm structures, such as crystalline silicon are generally able to tolerate compressive stress magnitudes far in excess of their maximum tensile stresses. Because the effective "lever arm" is also reduced due to the constrained boss, all stress magnitudes, both tensile and compressive are also reduced compared to the unconstrained boss case. Once the diaphragm becomes constrained from moving vertically by the contact with the boss, the lateral hydrostatic load develops a lateral compression within the diaphragm. Consequently, all tensile forces are reduced and all compressive forces are increased. By keeping the tensile stresses in check, the sensor is able to survive much higher external pressures than would otherwise be possible had the pressure only been applied to the top surface of the diaphragm.

Figure 3:
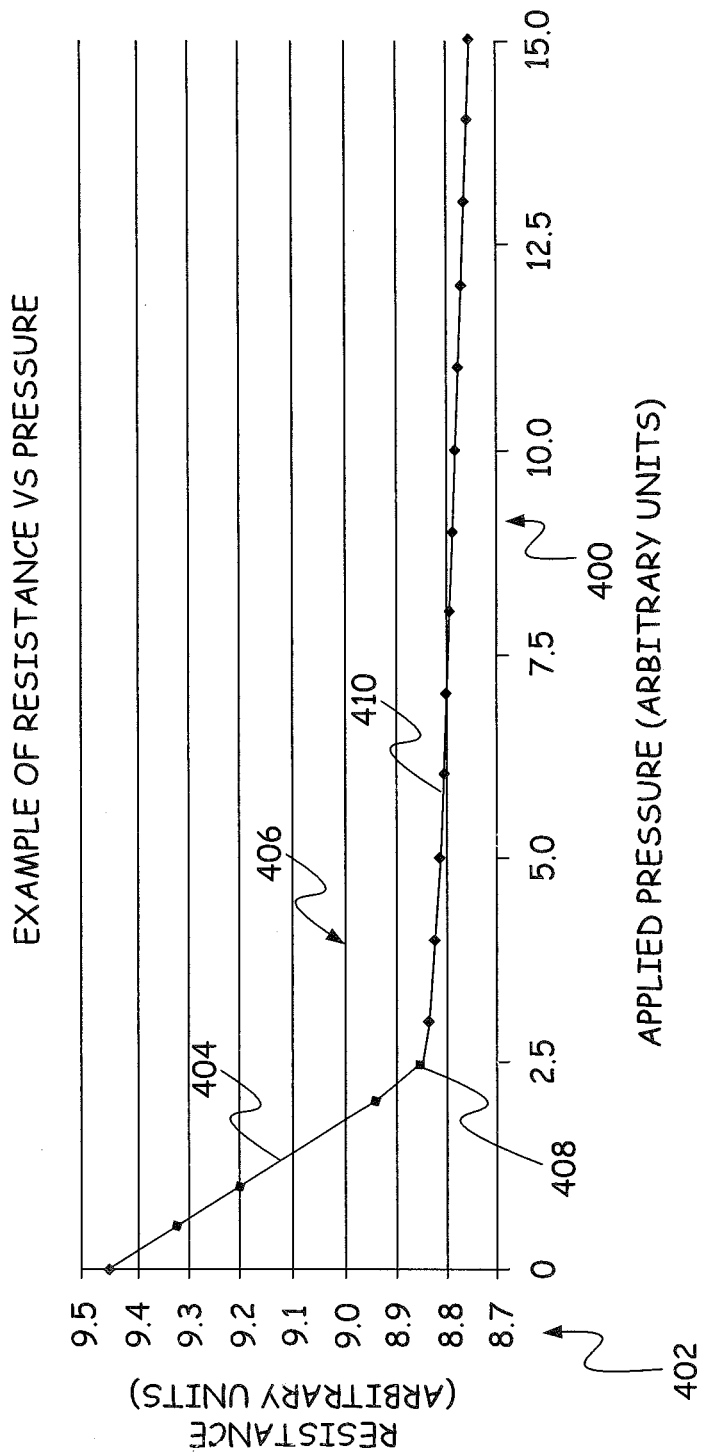
FIG. 3 provides an example graph of resistance values for diaphragm-edge tensile strain resistor on a pressure sensor of one embodiment as a function of pressure.

FIG. 3 provides an example graph of resistance versus pressure for a diaphragm-edge tensile strain resistor applied to the top of diaphragm 202 of FIG. 1. In FIG. 3, pressure is shown along horizontal axis 400 and resistance is shown along vertical axis 402. Before the boss of the diaphragm and/or base makes contact, the resistance changes monotonically as shown by portion 404 of graph 406. In accordance with some embodiments, portion 404 extends along the normal operating pressure range of the pressure sensor. When the applied pressure reaches the top of the normal operating pressure range, the boss(es) make contact at point 408 in graph 406. After the boss(s) make contact, the resistance continues to change monotonically with the applied pressure along portion 410 but at a different rate than along portion 404. This creates an opportunity for the system to continue to measure pressures well beyond the sensor's normal operating pressure range.

FIG. 4 provides a bottom perspective view and FIG. 5 provides a top perspective view of a pressure sensor 500 in accordance with one embodiment. In FIG. 4, pressure sensor 500 includes a base 502 having a pedestal or support 504 that is centrally located and can be connected to a housing that defines a chamber around pressure sensor 500. Diaphragm 506 is positioned above base 502 and is bonded to base 502 by a bonding layer 508. Along a top surface 510 of diaphragm 506, one or more sensing elements, such as sensing elements 512, 514, 516, 518, 520, 522, 524 and 526 are positioned to sense flexing of diaphragm 506 and/or changes in diaphragm 506 as it flexes in response to pressures applied to top surface 510 and side surfaces 530, 532, 534 and 536, which extend from top surface 510 along a closed perimeter 538 around top surface 510. Thus, side surfaces extend around the entirety of top surface 510 such that diaphragm 506 is isolated from contact with other structures and such that fluid around diaphragm 506 can apply lateral hydrostatic loading forces on each of the sides extending down from top surface 510 along the entirety of the closed perimeter 538 around top surface 510.

Sensing elements 512, 514, 516, 518, 520, 522, 524 and 526 each provide an output based on changes to diaphragm 506. In some embodiments, this output is an electrical characteristic such as a resistance or capacitance that can be sensed by applying an electrical current and/or voltage through electrical traces such as electrical traces 540 and 542 connected to sensing element 518. For example, when the sensing elements are piezoresistive elements, a current is passed through the piezoresistive element using the electrical traces and the resistance of the piezoresistive sensing element is measured based on the current or voltage output of the piezoresistive sensing element. Although piezoresistive sensing elements have been discussed, other examples of sensing elements include capacitance, optical displacement sensing, piezoelectric, and resonance sensing are possible.

In accordance with some embodiments, diaphragm 506 and base 502 are both formed from isotropically or anisotropically etched silicon wafers that are patterned to provide certain features as described below and then diced or cut from the wafers.

FIGS. 6 and 7 provide sectional views of pressure sensors 700 and 800, which represent two different embodiments. In FIG. 6, pressure sensor 700 includes diaphragm 702, base 704 and sensing elements on diaphragm 702 that are too small to be seen in FIG. 6. In accordance with some embodiments, diaphragm 702 and base 704 are both formed from isotropically or anisotropically etched silicon wafers that are patterned to provide certain features as described below and then diced or cut from the wafers. Base 704 has an etched pedestal 706, which acts as a stress isolation structure to keep package and mounting induced stresses from affecting the operation of pressure sensor 700. A bottom surface 708 of pedestal 706 mounts to a housing 750 such that diaphragm 702 is isolated from contact with other structures outside of pressure sensor 700 and is surrounded by fluid within a chamber 752 defined by housing 750.

Diaphragm 702 has a top surface 734 opposite base 704 and side surfaces that extend from top surface 734 toward base 704, such as side surfaces 730 and 732, along a closed perimeter around top surface 734. Thus, side surfaces extend around the entirety of top surface 734 such that diaphragm 702 is isolated from contact with other structures and such that fluid around diaphragm 702 can apply lateral hydrostatic pressure on each of the sides extending down from top surface 734 along the entirety of the closed perimeter around top surface 734. Diaphragm 702 also includes mounting portions or bonding portions 710 and 712 that are joined to base 704 by bonding layer portions 714 and 716. In one embodiment, bonding layer portions 714 and 716 is a high temperature glass-based bonding material often referred to as "frit". Bonding or mounting portions 710 and 712 protrude toward base 704 relative to an interior portion 718 of the diaphragm 702.

A high-pressure contact portion 720 of a boss 719 that is centrally located on diaphragm 702 protrudes toward base 704 from interior portion 718 is separated from a high-pressure contact portion 724 of base 704 by a gap 722. Across a first range of pressures, high-pressure contact portion 720 does not contact base 704 and sensing elements on diaphragm 702 provide a monotonic first rate of change with changes in applied pressures to the sides 730, 732 and top 734 of diaphragm 702. Above a pressure threshold, high-pressure contact portion 720 contacts base 704 at high-pressure contact point 724. After this contact, interior portion 718 acts as a secondary deflectable region and continues to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 702 and base 704.

In accordance with some embodiments, the thickness of gap 722 is controlled by the thickness of fit portions 714 and 716 such that high-pressure contact portion 720 is level with exterior surfaces of mounting portions 710 and 712.

Pressure sensor 800 of FIG. 7 is similar to the embodiment of FIG. 6 and elements that are common to the embodiment of FIG. 6 are numbered similarly and operate in the same manner In the embodiment of FIG. 7, bonding layer portions 714 and 716 have been removed and a diaphragm 802 with a shortened boss 819 and a centrally located high-pressure contact portion 820 is used in place of diaphragm 702. High-pressure contact portion 820 does not protrude from an interior portion 818 of diaphragm 802 as much as high-pressure contact portion 720 of FIG. 6 protrudes from interior portion 718. As a result, high-pressure contact portion 820 is recessed relative to mounting portions 810 and 812 so as to provide a gap 822 between high-pressure contact portion 724 of base 704 and high-pressure contact portion 820. In accordance with some embodiments, diaphragm 802 and base 704 are both formed from isotropically or anisotropically etched silicon wafers that are patterned to provide certain features as described below and then diced or cut from the wafers.

Diaphragm 802 has a top surface 834 opposite base 704 and side surfaces that extend from top surface 834, such as side surfaces 830 and 832, along a closed perimeter around top surface 834. Thus, side surfaces extend around the entirety of top surface 834 such that diaphragm 802 is isolated from contact with other structures and such that fluid around diaphragm 802 can apply lateral hydrostatic loading forces on each of the sides extending down from top surface 834 along the entirety of the closed perimeter around top surface 834.

In the embodiment of FIG. 7, diaphragm 802 is bonded to base 704 through a process such as a fusion bond, an anodic bond, a silicon alloy bond or a metal solder bond, for example. For embodiments that use an anodic bond, the diaphragm is made from silicon while the base is made from an ionic alkali glass.

In operation, pressure applied to sides 830 and 832 and top 834 of diaphragm 802 cause interior portion 818 of diaphragm 802 to flex toward base 704 such that sensing elements on top surface 834 provide monotonic signal changes with changes in the pressure. Above a pressure threshold, high-pressure contact portion 820 of diaphragm 802 contacts high-pressure contact portion 724 of base 704. After this contact, interior portion 818 acts as a secondary deflectable region and continues to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 802 and base 704.

Figure 8:
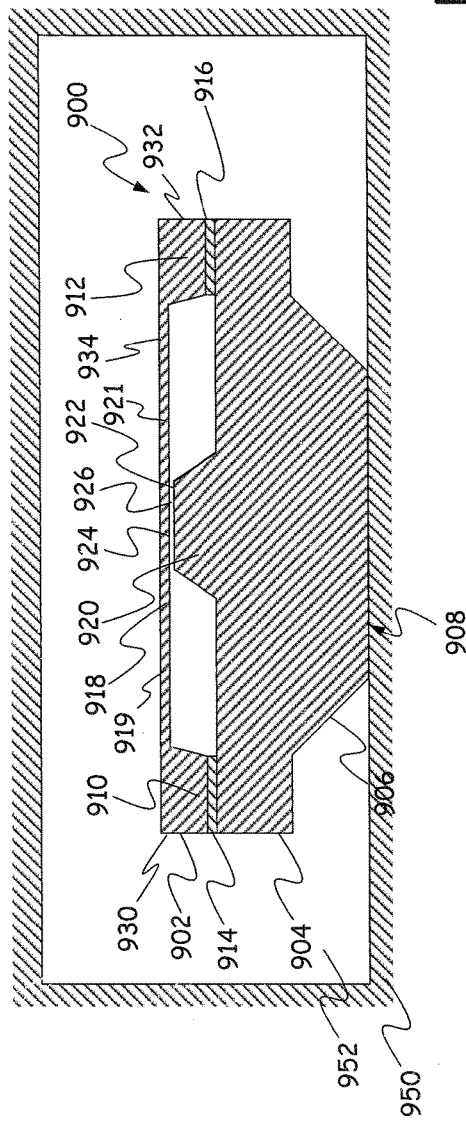
FIG. 8 provides a sectional view of a pressure sensor of a third embodiment.

FIG. 8 provides a sectional view of a pressure sensor 900 in accordance with a further embodiment. Pressure sensor 900 is mounted within a chamber 952 defined by a housing 950. Pressure sensor 900 includes a diaphragm 902, a base 904, and sensing elements that are too small to be seen in the view of FIG. 8. In accordance with some embodiments, diaphragm 902 and base 904 are both formed from isotropically or anisotropically etched silicon wafers that are patterned to provide certain features as described below and then diced or cut from the wafers.

Diaphragm 902 has a top surface 934 opposite base 904 and side surfaces that extend from top surface 934, such as side surfaces 930 and 932, along a closed perimeter around top surface 934. Thus, side surfaces extend around the entirety of top surface 934 such that diaphragm 902 is isolated from contact with other structures and such that fluid around diaphragm 902 can apply lateral hydrostatic loading forces on each of the sides extending down from top surface 934 along the entirety of the closed perimeter around top surface 934.

Base 904 includes a pedestal 906 having a mounting area 908 that mounts to housing 950 to allow fluid in chamber 952 to apply the lateral hydrostatic loads to sides 930 and 932 of diaphragm 902 and the vertical hydrostatic load to top 934 of diaphragm 902. Pedestal 906 acts as a stress isolation structure to keep package and mounting-induced stresses from affecting the operation of the sensor and to isolate diaphragm 902 from contact with other structures outside of pressure sensor 900.

Diaphragm 902 includes mounting portions 910 and 912 that protrude from an interior portion 918 of diaphragm 902 and are secured to base 904 by bonding layer portions 914 and 916. In accordance with one embodiment, bonding layer portions 914 and 916 are a high temperature glass-based bonding material often referred to as frit.

Base 904 includes a mesa 920 that protrudes toward interior portion 918 of diaphragm 902 and has a high-pressure contact portion 922 that aligns with a high-pressure contact portion 924 that is centrally located on an interior portion 918 of diaphragm 902. A gap 926 separates high-pressure contact portion 922 of base 904 from high-pressure contact portion 924 of diaphragm 902. In FIG. 8, interior portion 918 of diaphragm 902 is shown as being planar.

In operation, pressure applied to sides 930 and 932 and top 934 of diaphragm 902 cause interior portion 918 of diaphragm 902 to flex toward base 904 such that sensing elements on top surface 934 provide monotonic signal changes with changes in the pressure. Above a pressure threshold, high-pressure contact portion 924 of diaphragm 902 contacts mesa 920 at high-pressure contact portion 922. After this contact, portions 919 and 921 of interior portion 918 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 902 and mesa 920.

Figure 9:
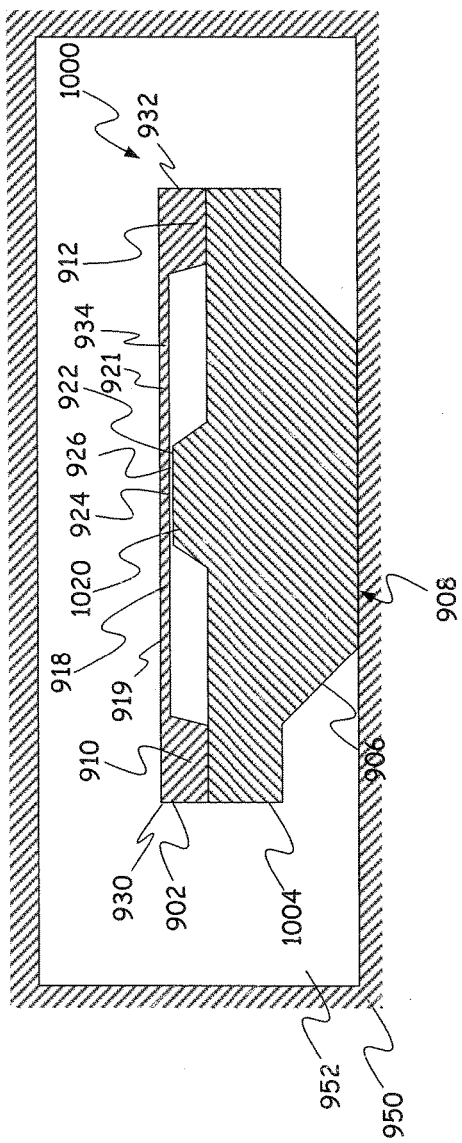
FIG. 9 provides a sectional view of a pressure sensor of a fourth embodiment.

FIG. 9 provides a sectional view of a pressure sensor 1000 that is similar to pressure sensor 900 of FIG. 8 except that bonding layer portions 914 and 916 have been removed and the height of mesa 920 has been shortened to form mesa 1020 in base 1004 such that the size of gap 926 continues to be the same. In accordance with some embodiments, diaphragm 902 and base 1004 are both formed from isotropically or anisotropically etched silicon wafers that are patterned to provide certain features as described below and then diced or cut from the wafers. Elements that are common to pressure sensor 900 are similarly numbered for pressure sensor 1000 and operate in the same manner as discussed above for pressure sensor 900. In pressure sensor 1000, diaphragm 902 is bonded to base 904 through a bonding technique such as fusion bonding, silicon alloy bonding, anodic bonding or metal solder bonding. For embodiments that use an anodic bond, the diaphragm is made from silicon while the base is made from an ionic alkali glass.

In operation, pressure applied to sides 930 and 932 and top 934 of diaphragm 902 cause interior portion 918 of diaphragm 902 to flex toward base 904 such that sensing elements on top surface 934 provide monotonic signal changes with changes in the pressure. Above a pressure threshold, high-pressure contact portion 924 of diaphragm 902 contacts mesa 1020 at high-pressure contact portion 922. After this contact, portions 919 and 921 of interior portion 918 act as secondary deflectable regions and continue to deflect with increases in the hydrostatic pressure load. The rate of change of the output of the sensing elements as a function of increased pressure changes after contact and becomes smaller than the rate of change before the contact. However, the change in the sensing element's output remains monotonic even after contact between diaphragm 902 and mesa 1020.

Figure 10:
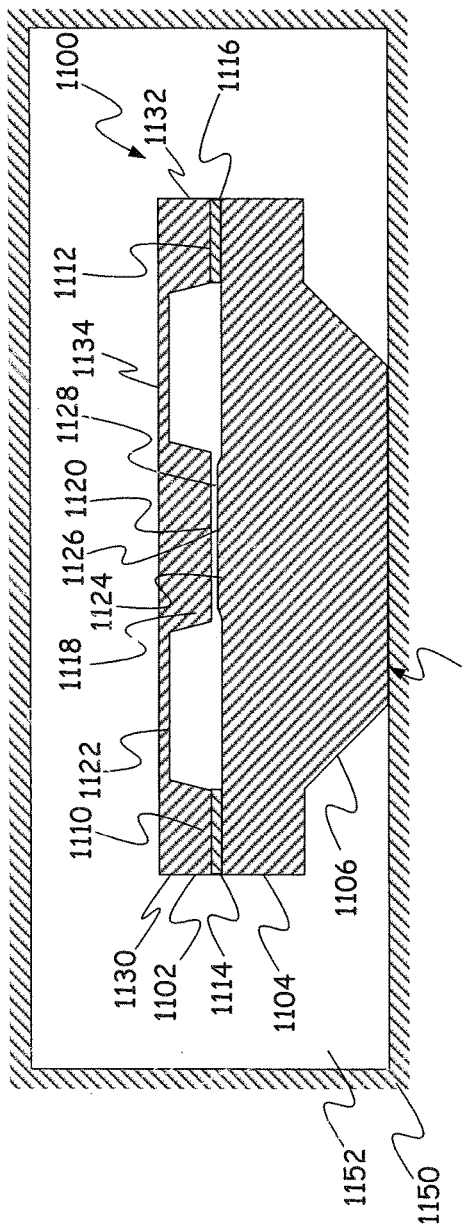
FIG. 10 provides a sectional view of a pressure sensor of a fifth embodiment.

FIG. 10 provides a sectional view of a pressure sensor 1100 under a further embodiment. Pressure sensor 1100 includes a diaphragm 1102, a base 1104, and sensing elements that are too small to be seen in the view of FIG. 10. In accordance with some embodiments, diaphragm 1102 and base 1104 are both formed from isotropically or anisotropically etched silicon wafers that are patterned to provide certain features as described below and then diced or cut from the wafers. Diaphragm 1102 has a top surface 1134 opposite base 1104 and side surfaces that extend from top surface 1134, such as side surfaces 1130 and 1132, along a closed perimeter around top surface 1134. Thus, side surfaces extend around the entirety of top surface 1134 such that diaphragm 1102 is isolated from contact with other structures and such that fluid around diaphragm 1102 can apply lateral hydrostatic loading forces on each of the sides extending down from top surface 1134 along the entirety of the closed perimeter around top surface 1134.

Base 1104 has a pedestal 1106 with a mounting surface 1108. Pedestal 1106 allows pressure sensor 1100 to be mounted to housing 1150, which forms a chamber 1152, such that fluid can provide the lateral hydrostatic load to sides 1130 and 1132 of diaphragm 1102 and can provide the vertical hydrostatic load to top 1134 of diaphragm 1102. Pedestal 1106 acts as a stress isolation structure to keep package and mounting induced stresses from affecting the operation of the sensor and to isolate diaphragm 1102 from contact with other structures outside of pressure sensor 1100.

Diaphragm 1102 includes bonding portions 1110 and 1112 that protrude toward base 1104 and are mounted to base 1104 by bonding layer portions 1114 and 1116. In accordance with one embodiment, bonding layer portions 1114 and 1116 are high temperature glass-based bonding materials often referred to as frit. Diaphragm 1102 also includes a boss 1118 having a centrally located high-pressure contact portion 1120. Boss 1118 protrudes toward base 1104 relative to an interior portion 1122 of diaphragm 1102. Base 1104 includes a mesa 1124 having a high-pressure contact portion 1126. Mesa 1124 protrudes toward diaphragm 1102. A gap 1128 is formed between boss 1118 and mesa 1124 at high-pressure contact portions 1120 and 1126. Over a first pressure range, lateral pressures on sides 1130 and 1132 and vertical pressure on top 1134 of diaphragm 1102 cause boss 1118 to move into gap 1128. Over the first pressure range, sensing elements on diaphragm 1102 produce an output that is monotonic with pressure changes and has a first rate of change with changes in the applied pressure. At a threshold pressure, high-pressure contact portion 1120 contacts high-pressure contact portion 1126. After this contact, interior portion 1122 acts as a secondary deflectable region and continues to deflect with increases in the hydrostatic pressure load causing sensing elements on diaphragm 1102 to continue to provide an output that is monotonic with pressure changes but that has a second rate of change with changes in the applied pressure.

Figure 11:
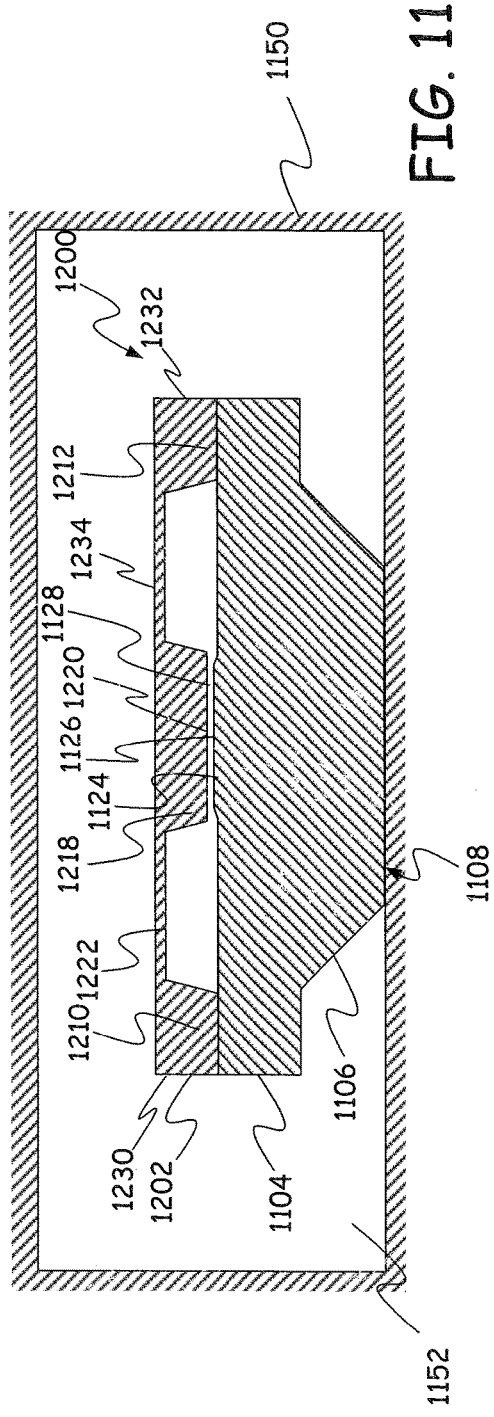
FIG. 11 provides a sectional view of a pressure sensor of a sixth embodiment.

FIG. 11 provides a sectional view of a pressure sensor 1200 that is similar to pressure sensor 1100 of FIG. 10 except that bonding layer portions 1114 and 1116 have been eliminated and diaphragm 1102 has been replaced by diaphragm 1202. In accordance with some embodiments, diaphragm 1202 and base 1104 are both formed from isotropically or anisotropically etched silicon wafers that are patterned to provide certain features as described below and then diced or cut from the wafers. Diaphragm 1202 has a top surface 1234 opposite base 1104 and side surfaces that extend from top surface 1234, such as side surfaces 1230 and 1232, along a closed perimeter around top surface 1234. Thus, side surfaces extend around the entirety of top surface 1234 such that diaphragm 1202 is isolated from contact with other structures and such that fluid around diaphragm 1202 can apply lateral hydrostatic loading forces on each of the sides extending down from top surface 1234 along the entirety of the closed perimeter around top surface 1234.

Diaphragm 1202 also includes bonding portions 1210 and 1212 that protrude toward base 1104 and are mounted directly to base 1104. Bonding portions 1210 and 1212 extend further from interior portion 1222 of diaphragm 1202 than bonding portions 1110 and 1112 extend from interior portion 1122 of diaphragm 1102. Diaphragm 1202 also includes a boss 1218 having a centrally located high-pressure contact portion 1220. Boss 1218 protrudes toward base 1104 relative to interior portion 1222. Other elements that are common to pressure sensor 1200 and pressure sensor 1100 are numbered the same as they are number in FIG. 10 and operate in the same manner.

In the embodiment of FIG. 11, diaphragm 1202 is bonded to base 1104 through a. process such as a fusion bond, an anodic bond, a silicon alloy bond or a metal solder bond, for example. For embodiments that use an anodic bond, the diaphragm is made from silicon while the base is made from an ionic alkali glass.

Over a first pressure range, lateral pressures on sides 1230 and 1232 and vertical pressure on top 1234 of diaphragm 1202 cause boss 1218 to move into gap 1128. Over the first pressure range, sensing elements on diaphragm 1202 produce an output that is monotonic with pressure changes and has a first rate of change with changes in the applied pressure. At a threshold pressure, high-pressure contact portion 1220 contacts high-pressure contact portion 1126. After this contact, interior portion 1222 acts as a secondary deflectable region and continues to deflect with increases in the hydrostatic pressure load causing sensing elements on diaphragm 1202 to continue to provide an output that is monotonic with pressure changes but that has a second rate of change with changes in the applied pressure.

Figure 12:
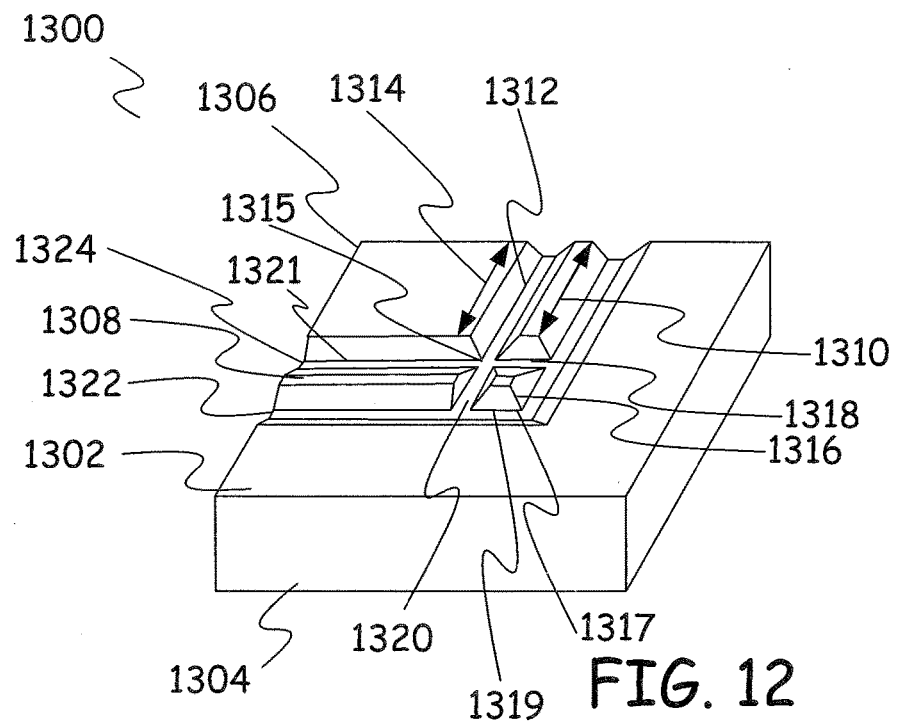
FIG. 12 provides a bottom perspective view of a quarter symmetry section of a diaphragm of a further embodiment.
Figure 13:
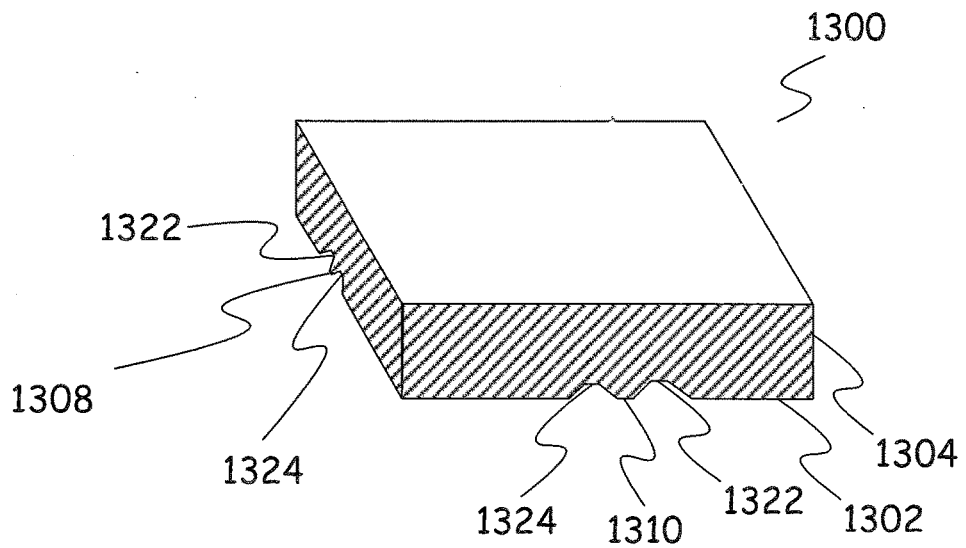
FIG. 13 provides a top perspective view of the section of the diaphragm of FIG. 12.

FIG. 12 provides a bottom perspective view and FIG. 13 provides a top perspective view of a quarter symmetry section 1300 of a diaphragm in accordance with a further embodiment. Diaphragm section 1300 is shown to include bonding portion 1302 that extends around an outer perimeter 1304 of the diaphragm. A main boss 1306 located at the center of the diaphragm extends down from the bottom surface of the diaphragm toward the base of the pressure sensor. Secondary bosses 1308 and 1310 form ridges that have lengths that match the lengths of main boss 1306. For example, length 1312 of secondary boss 1310 matches length 1314 of main boss 1306. In the complete diaphragm, there are four secondary bosses, one on each side of main boss 1306.

Diaphragm section 1300 also includes a pyramid boss 1316 that is formed along the intersection of lines extending from and along secondary bosses 1308 and 1310. As such, pyramid boss 1316 is positioned at and proximate to a corner 1315 between two sides of main boss 1306. Pyramid boss 1316 is separated from secondary boss 1310 by a channel 1318 and is separated from secondary boss 1308 by a channel 1320. Pyramid boss 1316 has a square base 1317 with edges, such as edge 1319, that are parallel to edges of main boss 1306, such as edge 1321, and edges of secondary bosses 1308 and 1310. In the full diaphragm, there are four such pyramid bosses. Secondary bosses 1308 and 1310 and pyramid boss 1316 are separated from bonding portion 1302 by a channel 1322 that extends around the interior of bonding portion 1302 along the entirety of the diaphragm. Secondary bosses 1308 and 1310 are separated from main boss 1306 by a channel 1324 that surrounds main boss 1306.

Each of main boss 1306, secondary bosses 1308 and 1310 and pyramid boss 1316 can act as a high-pressure contact portion that will contact the base area when the pressure applied to the diaphragm exceeds a threshold.

Figure 14:
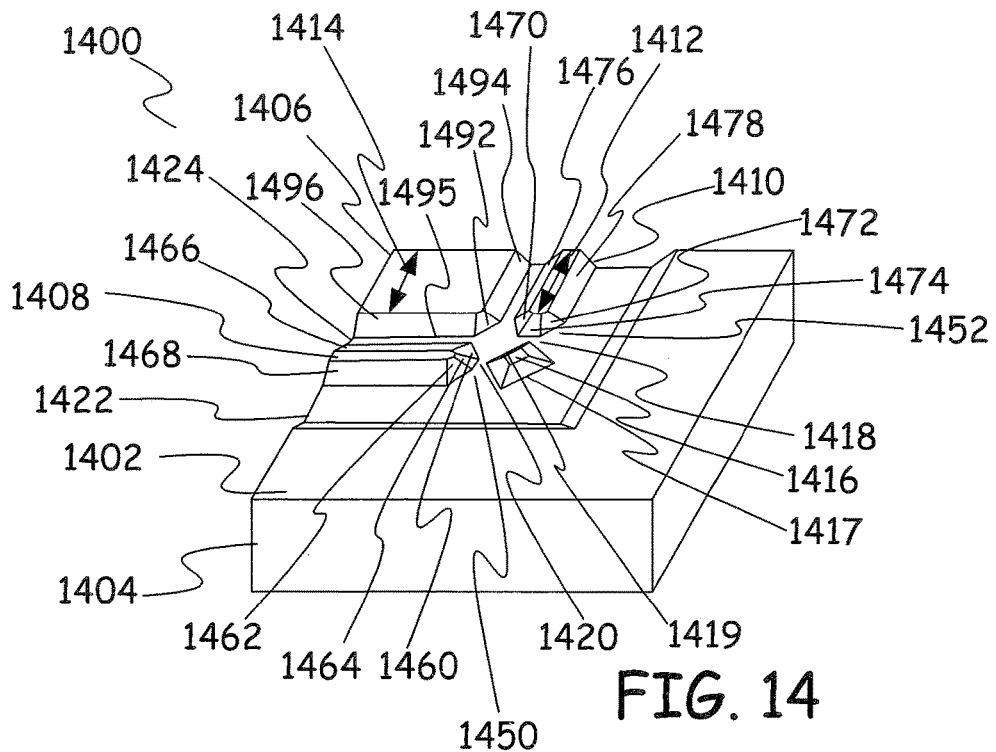
FIG. 14 provides a bottom perspective view of a quarter symmetry section of a diaphragm of a further embodiment.
Figure 15:
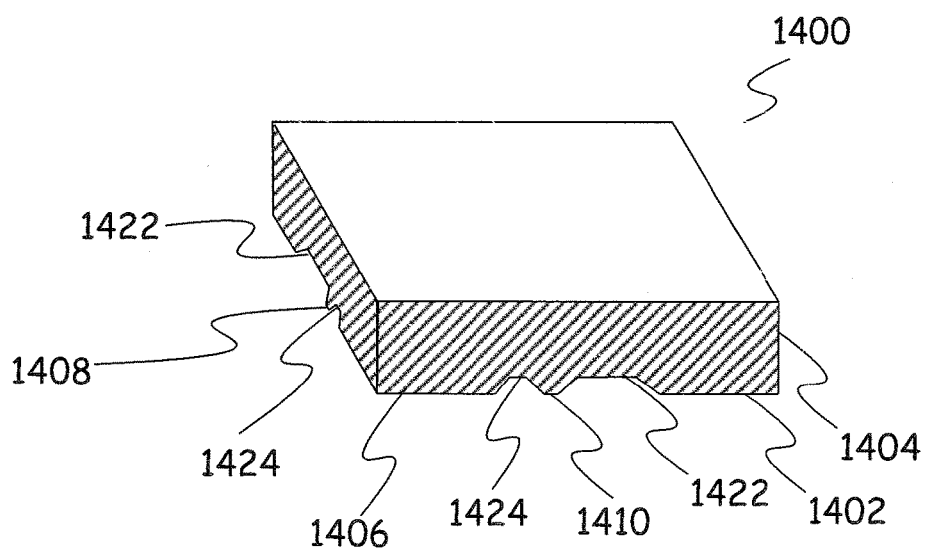
FIG. 15 provides a top perspective view of the section of the diaphragm of FIG. 14.

FIG. 14 provides a bottom perspective view and FIG. 15 provides a top perspective view of a quarter symmetry section 1400 of a diaphragm in accordance with a further embodiment. Diaphragm section 1400 is shown to include bonding portion 1402 that extends around an outer perimeter 1404 of the diaphragm. A main boss 1406 located at the center of the diaphragm extends down from the bottom surface of the diaphragm toward the base of the pressure sensor. Secondary bosses 1408 and 1410 form ridges that have lengths that match the lengths of main boss 1406. For example, length 1412 of secondary boss 1410 matches length 1414 of main boss 1406. In the complete diaphragm, there are four secondary bosses, one on each side of main boss 1406. Each of the secondary bosses has an edge that is parallel to an edge of main boss 1406.

In the embodiment of FIG. 14, length 1414 of main boss 1406 is less than length 1314 of main boss 1306 of the embodiment of FIG. 12. This reduction in the size of main boss 1406 allows the secondary bosses, such as secondary bosses 1408 and 1410, to be shifted toward the center of the diaphragm in the embodiment of FIGS. 14 and 15. This inward shift of the secondary bosses moves the secondary bosses to positions where there is less stress on the secondary bosses during overpressure events thereby reducing the likelihood of fractures developing in the secondary bosses during overpressure events.

Diaphragm section 1400 also includes a pyramid boss 1416 that is formed at the intersection of lines extending from and along secondary bosses 1408 and 1410. Pyramid boss 1416 is separated from secondary boss 1410 by a channel 1418 and is separated from secondary boss 1408 by a channel 1420. In the embodiment of FIGS. 14 and 15, pyramid boss 1416 is rotated forty-five degrees on a central axis of pyramid boss 1416 relative to pyramid boss 1316 of FIGS. 12 and 13. As a result, the edges of square base 1417 of pyramid boss 1416, such as edge 1419, are at forty-five degree angles to the intersecting lines extending from secondary bosses 1408 and 1410. In addition, the edges of square base 1417 are oblique to side edges of main boss 1406, such as side edge 1495, and as such are not parallel with the side edges of main boss 1406. This rotation moves a corner of pyramid boss 1416 away from a high tensile stress field that develops in diaphragm 1400 during overpressure events. In the full diaphragm, there are four such pyramid bosses.

Secondary bosses 1408 and 1410 and pyramid boss 1416 are separated from bonding portion 1402 by a channel 1422 that extends around the interior of bonding portion 1402 along the entirety of the diaphragm. Secondary bosses 1408 and 1410 are separated from main boss 1406 by a channel 1424 that surrounds main boss 1406.

Secondary bosses 1408 and 1410 have chamfered ends 1450 and 1452. Chamfered end 1450 includes two chamfered corners or faces 1460 and 1462 that are at forty-five degrees to an end face 1464 and are at forty-five degrees to two respective side faces 1466 and 1468. Chamfered end 1452 includes two chamfered corners or faces 1470 and 1472 that are at forty-five degrees to an end face 1474 and are at forty-five degrees to two respective side faces 1476 and 1478. In the embodiment of FIGS. 14 and 15 each end of each of the secondary bosses is chamfered in the same mariner as chamfered ends 1450 and 1452.

Main boss 1406 has a chamfered corner/face 1492 that is at forty-five degrees to two side faces 1494 and 1496 and faces pyramid boss 1416. As a result, an edge of chamfered corner 1492 is parallel to edge 1419 of pyramid boss 1416. In the embodiment of FIGS. 14 and 15, each corner of main boss 1406 is chamfered in the same manner as chamfered corner 1492.

The chamfered ends of the secondary bosses and the chamfered corners of main boss 1406 reduce stress amplification on the secondary bosses and the main boss due to geometric effects. To further reduces such stress, some embodiments utilize a dry isotropic etch to round the corners and edges of the bosses. In one particular embodiment, the dry isotropic etch provides edges with a radius of curvature of 16 μm.

Figure 16:
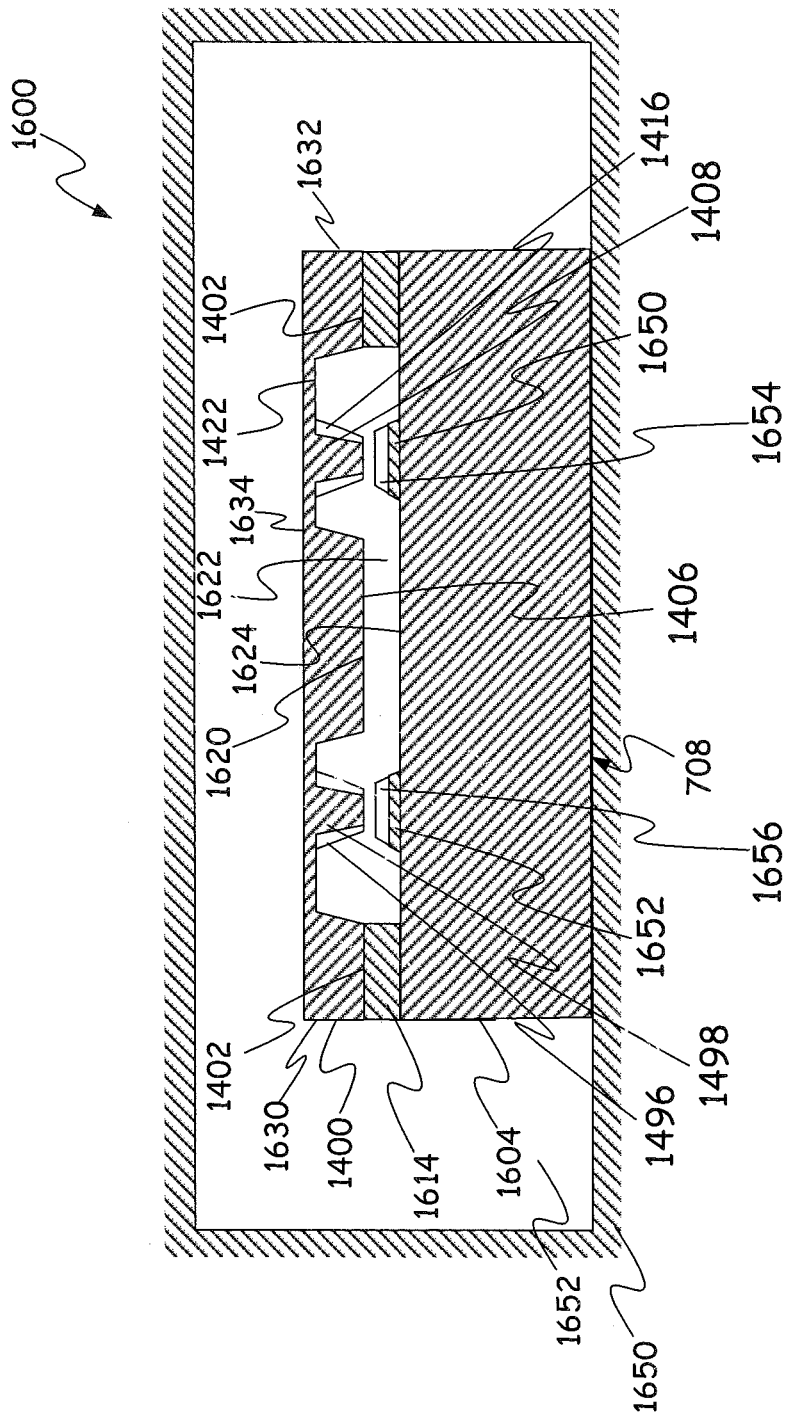
FIG. 16 provides a sectional view of a pressure sensor using the diaphragm of FIG. 14.

FIG. 16 provides a sectional view of a pressure sensor 1600 of a further embodiment. In FIG. 16, pressure sensor 1600 includes diaphragm 1400 of FIG. 14, a base 1604 and sensing elements on diaphragm 1400 that are too small to be seen in FIG. 16. In accordance with some embodiments, diaphragm 1400 and base 1604 are both formed from isotropically etched silicon wafers that are patterned to provide certain features as described below and then diced or cut from the wafers. A bottom surface 1608 of base 1604 mounts to a housing 1650 such that diaphragm 1400 is isolated from contact with other structures outside of pressure sensor 1600 and is surrounded by fluid within a chamber 1652 defined by housing 1650. Diaphragm 1400 has top surface 1634 opposite base 1604 and side surfaces that extend from top surface 1634 toward base 1604, such as side surfaces 1630 and 1632, along a closed perimeter around top surface 1634. Thus, side surfaces extend around the entirety of top surface 1634 such that diaphragm 1400 is isolated from contact with other structures and such that fluid around diaphragm 1400 can apply lateral hydrostatic pressure on each of the sides extending down from top surface 1634 along the entirety of the closed perimeter around top surface 1634. Diaphragm 1400 also includes mounting portion or bonding portion 1402 that is joined to base 1604 by bonding layer 1614. In one embodiment, bonding layer 1614 is a high temperature glass-based bonding material often referred to as "frit". Bonding or mounting portion 1402 protrudes toward base 1604 relative to channel 1422 in the interior portion of diaphragm 1400.

A high-pressure contact portion 1620 of main boss 1406 protrudes toward base 1604 and is separated from a high-pressure contact portion 1624 of base 1604 by a gap 1622. Bar mesas 1650 and 1652 are positioned on base 1604 and are aligned with and extend upward toward secondary bosses 1408 and 1498, respectively, of diaphragm 1400. Pyramid mesas 1654 and 1656 are positioned on base 1604 and are aligned with and extend upward toward pyramid bosses 1416 and 1496, respectively, of diaphragm 1400. Bar mesas 1650 and 1652 extend a first distance above contact portion 1624 of base 1604 and pyramid mesas 1654 and 1656 extend a second distance above contact portion 1624, where the second distance is greater than the first distance such that the tops of the pyramid mesas are closer to the bottoms of the pyramid bosses than the tops of bar mesas are to the bottoms of the secondary bosses. Similarly, the tops of the bar mesas are closer to the bottoms of the secondary bosses than high-pressure contact portion 1624 is to high-pressure contact portion 1620 of main boss 1406.

Across a first range of pressures, high-pressure contact portion 1620 does not contact base 1604, secondary bosses 1408 and 1498 do not contact bar mesas 1650 and 1652 and pyramid bosses 1416 and 1496 do not contact pyramid mesas 1654 and 1656. As a result, sensing elements on diaphragm 1400 provide a monotonic first rate of change with changes in applied pressures to the sides 1630, 1632 and top 1634 of diaphragm 1400. With these changes in the applied pressure, diaphragm 1400 flexes downward such that main boss 1406 deflects further than secondary bosses 1408 and 1498 and such that secondary bosses 1408 and 1498 deflect further than pyramid bosses 1416 and 1496.

Above a pressure threshold, high-pressure main boss 1406 contacts base 1604 at high-pressure contact point 1624 while at substantially the same time, secondary bosses 1408 and 1498 contact bar mesas 1650 and 1652 and pyramid bosses 1416 and 1496 contact pyramid mesas 1654 and 1656. This nearly simultaneous contact is achieved because each of the various bosses is separated from a corresponding portion of the base or mesa by a distance that is substantially equal to the distance that the respective boss deflects at the pressure threshold. For example, main boss 1406 deflects the most of any of the bosses and is separated from base 1604 by the greatest distance. Secondary bosses 1408 and 1498 deflect less than main boss 1406 but are separated from bar mesas 1650 and 1652 by a smaller distance because bar mesas 1650 and 1652 are raised relative to contact point 1624 on base 1604. Pyramid bosses 1416 and 1496 deflect the least and are separated from pyramid mesas 1654 and 1656 by the smallest distance because pyramid mesas 1654 and 1656 are raised higher than bar mesas 1650 and 1652.

Figure 17:
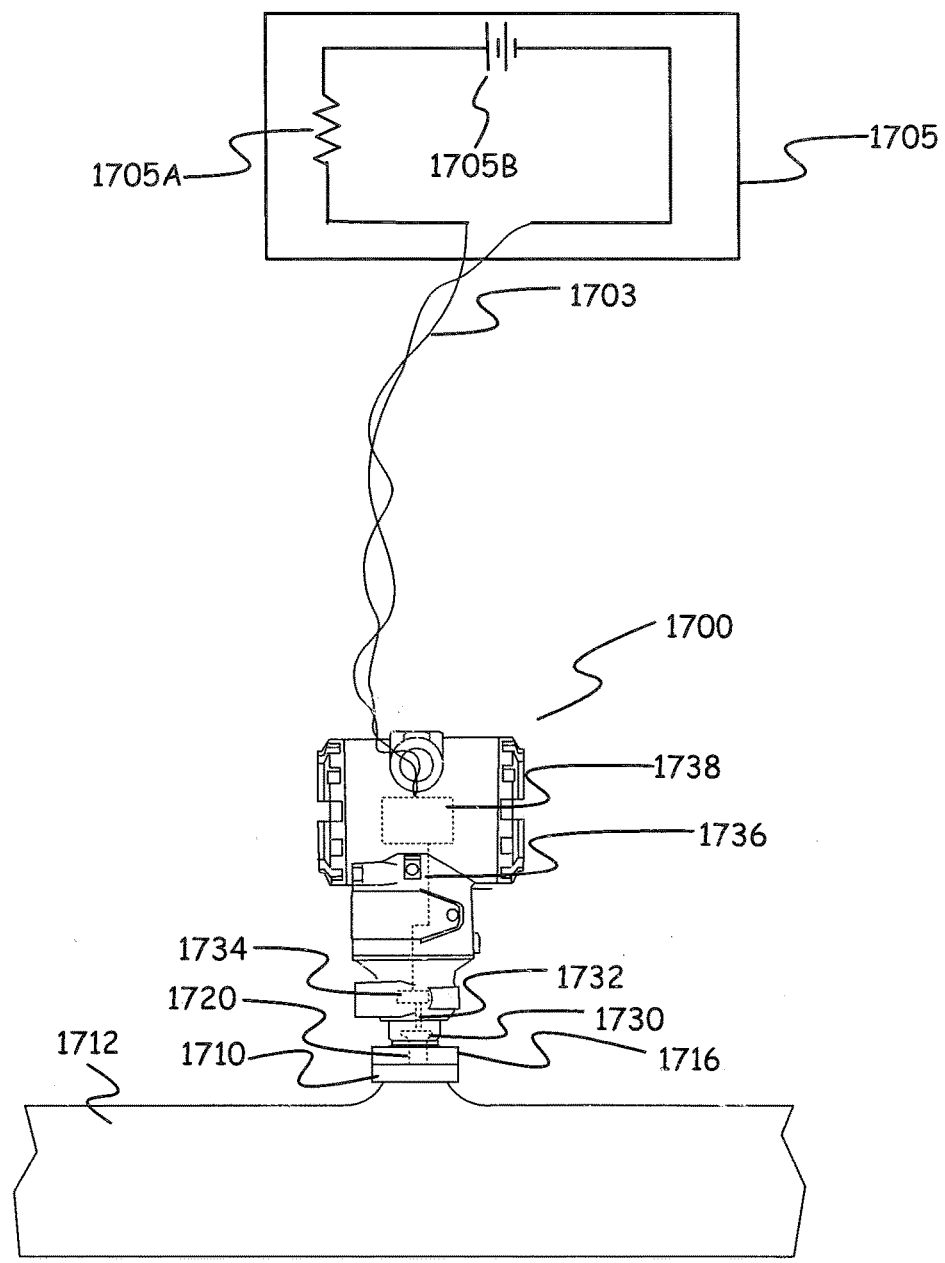
FIG. 17 provides a simplified diagram of a portion of an industrial process control system in which embodiments may be utilized.

FIG. 17 is a perspective view of a portion of a process control system in which the pressure sensors described above are used in accordance with some embodiments. In FIG. 17, a process variable transmitter 1700 is mounted to a process coupling 1710 of a pipe section 1712 by a mounting member 1716.

Mounting member 1716 includes a bore 1720 which extends from process coupling 1710 to an isolation diaphragm assembly 1730. Isolation diaphragm assembly 1730 includes an isolation diaphragm that isolates the process fluid in pipe section 1712 from isolation fluid carried in an isolation capillary 1732. Isolation capillary 1732 couples to a pressure sensor 1734, which takes the form of one of the pressure sensors described above. Sensor 1734 is configured to measure an absolute pressure (relative to vacuum) or a gage pressure (relative to atmospheric pressure) and provide an electrical output 1736 to transmitter circuitry 1738.

Transmitter circuitry 1738 communicates with a control room 1705 to provide one or more process variables to control room 1705, such as absolute pressure and gage pressure. Transmitter circuitry 1738 may communicate with control room 1705, illustrated as a resistance 1705A and a power supply 1705B, using various techniques including both wired and wireless communication. One common wired communication technique uses what is known as a two-wire process control loop 1703 in which a single pair of wires is used to carry information as well as provide power to transmitter 1700. One technique for transmitting information is by controlling the current level through process control loop 1703 between 4 milliamps and 20 milliamps. The value of the current within the 4-20 milliamp range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART® in accordance with IEC 62591, may also be implemented.

Although the present invention has been described with reference to preferred embodiments, workers skilled in the art will recognize that changes may be made in form and detail without departing from the spirit and scope of the invention.

What is claimed is:
1. A sensor comprising:
   a diaphragm having a bonding portion and a main boss separated from the bonding portion by at least one channel, the main boss having a first side face, a second side face and a chamfered corner face connecting the first side face to the second side face;
a base having a first contact area aligned with the main boss and separated from the main boss, wherein the bonding portion of the diaphragm is bonded to the base; and
at least one sensing element that senses movement of the diaphragm.

2. The sensor of claim 1 wherein the main boss further comprises a third side face and a fourth side face and a second chamfered corner face between the second side face and the third side face, a third chamfered corner face between the third side face and the fourth side face and a fourth chamfered corner face between the fourth side face and the first side face.

3. The sensor of claim 1 further comprising a secondary boss separated from the first side face of the main boss by a channel, the secondary boss having a first side surface, an end surface, and a first chamfered corner surface between the first side surface and the end surface.

4. The sensor of claim 3 further comprising a second secondary boss separated from the second side face of the main boss by a second channel, a third secondary boss separated from the third side face of the main boss by a third channel, and a fourth secondary boss separated from the fourth side face of the main boss by a fourth channel.

5. The sensor of claim 4 wherein a length of the main boss is the same as a length of the secondary boss.

6. The sensor of claim 4 further comprising a first pyramid boss located at an intersection of a line through the secondary boss and a line through the second secondary boss.

7. The sensor of claim 6 wherein the pyramid boss has a base edge that is at forty-five degrees to the line through the secondary boss.

8. The sensor of claim 6 wherein the base further comprises a contact bar mesa aligned with and separated from the secondary boss and a contact pyramid mesa aligned with and separated from the first pyramid boss such that above a pressure threshold, the main boss contacts the first contact area while nearly simultaneously the secondary boss contacts the contact bar mesa and the first pyramid boss contacts the contact pyramid mesa.

9. The sensor of claim 1 wherein the main boss has rounded boss edges.

10. A pressure sensor comprising:
a base;
a diaphragm positioned over the base and having at least one boss with a chamfered corner; and
a sensing element positioned to sense changes in the diaphragm.

11. The pressure sensor of claim 10 wherein the at least one boss comprises a main boss centrally located on the diaphragm.

12. The pressure sensor of claim 11 further comprising at least one secondary boss positioned on a side of the main boss and having at least one chamfered corner.

13. The pressure sensor of claim 10 further comprising a pyramid boss positioned such that the chamfered corner of the main boss faces the pyramid boss.

14. The pressure sensor of claim 13 wherein the pyramid boss has a square base such that one edge of the square base is parallel to an edge of the chamfered corner.

15. The pressure sensor of claim 12 further comprising a pyramid boss positioned such that the chamfered corner of the main boss faces the pyramid boss.

16. The pressure sensor of claim 10 wherein the boss has rounded edges formed through dry isotropic etching.

17. A pressure sensor comprising:
a base;
a diaphragm comprising a main boss with two edges and a corner between the two edges and a pyramid boss positioned proximate the corner of the main boss and having a base with an edge that is oblique to both of the two edges of the main boss; and
a sensing element that senses movement of the diaphragm.

18. The pressure sensor of claim 17 wherein corner between the two edges of the main boss is chamfered.

19. The pressure sensor of claim 18 wherein the chamfered corner of the main boss has an edge that is parallel to the edge of the pyramid boss.

20. The pressure sensor of claim 17 further comprising a secondary boss having a base with an edge that is parallel to one of the two edges of the main boss.

21. The pressure sensor of claim 17 wherein the secondary boss comprises at least one chamfered corner.

* * * * *